Patented July 4, 1944

2,352,782

UNITED STATES PATENT OFFICE 2,352,782

TRIMETHYLENE CHLORBROMIDE

Clyde B. Gardenier, Belleville, N. J., assignor to Thomas A. Edison, Incorporated, West Orange, N. J., a corporation of New Jersey No Drawing. Application February 21, 1942, Serial No. 431,815

2 Claims. (Cl. 260—658)

My invention relates to the production of trimethylene chlorbromide (propane 3 chlor 1 bromide), and has for its objects to provide a simple and efficient method of preparing trimethylene chlorbromide which can be controlled with certainty and which can be carried out economically and practicably for commercial purposes.

Trimethylene chlorbromide, like trimethylene bromide and trimethylene chloride, has particular utility as an intermediary product in the preparation of cyclopropane gas. All of these trimethylene products have however been expensive to prepare either because of the cost of the original ingredients used or because of the difficulties involved in obtaining a reaction between the ingredients to produce the desired product.

For example, trimethylene bromide can be prepared by reacting hydrobromic acid with trimethylene glycol. Although this reaction can be carried out easily, this method of preparing trimethylene bromide is yet very expensive because of the high cost of the glycol ingredient. Also trimethylene bromide can be prepared by the direct addition of hydrobromic acid to allyl bromide. While these ingredients are not expensive the methods which have been proposed for carrying out their addition have been very difficult and uncertain in their results. For instance, in some of these proposed methods it has been required that the reaction be carried out in temperatures as low as −19° C., in others that the reactions be carried out in the dark, while in still others it has been required that the reactions be extended over long periods as of several days in length. Even when these methods are carried out under these unfavorable and impracticable conditions, they have produced only low yields of the desired propane 1:3 compound, in mixture with large percentages of other addition products such as of propane 1:2 compounds.

I have found however, that trimethylene chlorbromide can be produced rapidly and inexpensively by a direct addition of hydrobromic acid (hydrogen bromide) to allyl chloride. In carrying out this addition in accordance with my invention, I (1) provide the allyl chloride in intimate contact with moisture up to the limit of mutual solubility, (2) purge the aqueous allyl chloride fluid mixture of all gases other than of oxygen, and then (3) introduce hydrogen bromide into the allyl chloride mixture while the latter is in an atmosphere of substantially pure oxygen. In so introducing the hydrogen bromide into the allyl chloride while the latter is in intimate presence with moisture and oxygen, and is excluded of all other substances, I find that the moisture and oxygen act jointly and separately as catalyzing agents to induce a spontaneous addition of the hydrogen bromide to the allyl chloride. As the addition process continues considerable heat is generated, but that heat of addition is counteracted by suitable cooling so that the temperature of the liquid mixture does not reach the boiling temperature of the allyl chloride. When carried out in this manner, the process is rapid and efficient as the process can be carried out to completion on a commercial scale within an ordinary work period, and will result in the production of substantially pure trimethylene chlorbromide in substantially 100% yields.

My invention is preferably carried out in the following specific manner: into a water-jacketed glass-lined autoclave, which is equipped with a water-cooled reflux condenser and with a thermometer and hydrometer, there is introduced 50 pounds, for example, of raw liquid allyl chloride, which is a product produced cheaply in the chlorination of petroleum gases. Then distilled water is introduced into the autoclave in the amount of about 1% by weight of the allyl chloride. All ports of the apparatus are next closed to the atmosphere, except the top of the reflux condenser, and substantially pure oxygen gas (say of 99.5% purity) is thereafter introduced into the autoclave through a glass inlet tube. This tube is extended to the bottom of the autoclave into the allyl chloride liquid so that the flow of the oxygen gas will agitate the allyl chloride and saturate it with the distilled water. During this time the temperature of the mixture in the autoclave may be anywhere below the boiling temperature of the allyl chloride, which is 44.6° C. When the flow of the oxygen gas into the autoclave has continued to the point where the air in the allyl chloride liquid mixture and in the autoclave has been substantially displaced by oxygen gas and the escaping gases at the top of the reflux condenser analyze approximately 95% oxygen, purified gaseous hydrogen bromide is introduced into the continuing oxygen gas flow, these gases being introduced typically at the rate of about 1,000 liters of hydrogen bromide and 10 liters of oxygen per hour. At first there occurs a complete absorption of all entering gases in the allyl chloride mixture, which is evidenced by a rapid fall in temperature within the autoclave. This fall in the temperature lasts for about a half hour. Then, as is evidenced by a rise in temperature, there begins an addition of the hydrogen bromide to the allyl chloride according to the following equation:

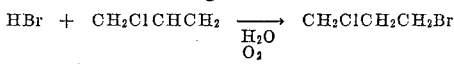

or structurally as

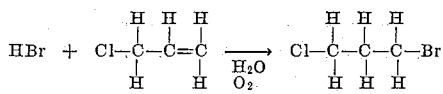

Within a period typically not greater than one hour sufficient hydrogen bromide and oxygen are absorbed to hasten the reaction, and addition proceeds with increasing vigor and with an ever-increasing rise in temperature, which temperature rise is however counteracted by external water cooling so as not to exceed the boiling temperature of the allyl chloride. Should any of the allyl chloride however vaporize, it will be returned to the autoclave by the reflux condenser, leaving only oxygen gas to escape.

The addition process continues in the manner above described and is deemed to reach completion when the density of the liquid product reaches about 1.58. This liquid product is then drawn from the autoclave, is washed with a saturated aqueous sodium carbonate solution, and is then fractionally distilled in a column still under vacuum. The fraction boiling at 146° C. and showing a density of 1.588 is pure water-white trimethylene chlorbromide (propane 3 chlor 1 bromide), and represents a well-nigh 100% yield.

It will be understood that I intend no unnecessary limitation of my invention to the details and particular proportions herein specified as these may be varied without departing from the scope of my invention, which I endeavor to express according to the following claims.

I claim:

1. The method of preparing trimethylene chlorbromide comprising saturating with substantially pure oxygen a solution of allyl chloride and water and adding to said solution hydrogen bromide and substantially pure oxygen.

2. The method of preparing trimethylene chlorbromide comprising saturating with substantially pure oxygen an aqueous solution of allyl chloride, adding to said solution hydrogen bromide and substantially pure oxygen and maintaining the temperature of said mixture below the boiling point of said solution.

CLYDE B. GARDENIER.